Nov. 4, 1952 — L. B. WEYMOUTH — 2,616,823

LAMINATED PANEL

Filed Jan. 30, 1948

INVENTOR.
Lawrence B. Weymouth.
BY
Elmer Jamison Gray
ATTORNEY.

Patented Nov. 4, 1952

2,616,823

UNITED STATES PATENT OFFICE 2,616,823

LAMINATED PANEL

Lawrence B. Weymouth, Detroit, Mich., assignor to Briggs Manufacturing Company, Detroit, Mich., a corporation of Michigan Application January 30, 1948, Serial No. 5,260

14 Claims. (Cl. 154—106)

This invention relates to articles formed of laminations of sheet material bonded together, such as by means of resinous substances, the invention being particularly applicable to the manufacture of panels useful for trimming the interiors of automobile or other vehicle bodies.

In the manufacture of interior trim panels for automobile bodies it has been customary to form the panel of three principal laminations, namely, a relatively heavy or stiff foundation board, an outer layer of fabric or other ornamental sheet, and an interposed layer of wadding or padding. These layers have either been secured together by lines of ornamental stitching or have been bonded together at desired localities by press operation through the medium of resinous materials. Where the latter method has been employed it has been the usual practice to coat or treat one or more of the layers with a liquid or varnish containing the resin and thereafter to consolidate the layers together in a press under the influence of heat.

Certain serious disadvantages have been found in the bonding methods heretofore employed which have constituted a deterrent to the practical commercial use of such methods. Where the resinous material is coated on the foundation board and wadding layer great difficulty is encountered in accurately controlling the amount of resinous material used. An excess of the material will increase undesirably the cost of the panel and frequently will result in the resin soaking through the outer covering and marring the appearance thereof. Moreover, where the bonding material is applied to the wadding or padding layer an excessive quantity is usually used since the wadding soaks up this material, and hence during the hot press operation excessive quantities of the resin penetrate the outer fabric layer. Due to the high cost of the bonding agents, especially thermo-setting resins, it is important in large scale production that the amount of resin used be controlled fairly accurately. It is important that a simple and easy method be utilized for applying or introducing the resin into the assembly so as to further reduce costs.

An object of the invention, therefore, is to provide an improved laminated panel and method of making the same in which the laminations are bonded together in a relatively simple, relatively inexpensive and improved manner and whereby a panel is produced having improved characteristics and the desired appearance.

A further object of the invention is to provide a panel or other laminated article comprising a foundation board, a layer of padding, and a covering layer of cloth, fabric or other suitable material, and wherein the several layers are bonded together under pressure at desired localities, such as along ornamental lines, through the medium of resin or bonding material contained in a low density relatively thick paper or pulp sheet interposed between the foundation board and padding. Such sheet is preferably rather soft and compressible and hence may compress to varying degrees under the action of the dies, thus rendering the ornamental lines, where pressure is applied, more pronounced and distinct while at the same time ensuring efficient bonding together of the layers free of excess resin. Furthermore, by using such a resin bearing sheet between the foundation and padding and by eliminating any layer of resin between the padding and outer covering the soft upholstered characteristic or "feel" of the panel is preserved since no hardened or stiffening layer is introduced between the outer covering and the layer of padding tending to destroy or impair the desired upholstered or cushioned feel of the panel.

Still another object of the invention is to provide a trim panel having an aperture therethrough for receiving the handle shaft or other actuating member commonly mounted upon an automobile door for operating a door lock, window regulator or other device, such aperture being formed centrally in a countersunk depression or recess providing a relatively narrow marginal area bounding the aperture wherein the padding and covering material are compressed and consolidated with the foundation to produce a sealed edge surrounded by a flat, relatively hard annular seat offset below the adjoining areas of the panel.

Other objects of this invention will appear in the following description and appended claims, reference being had to the accompanying drawings forming a part of this specification wherein like reference characters designate corresponding parts in the several views.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
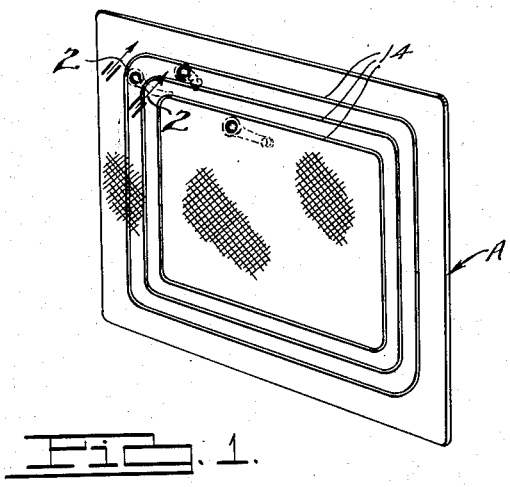
Fig. 1 is a perspective view of a trim panel constructed in accordance with the present invention.
Figure 2:
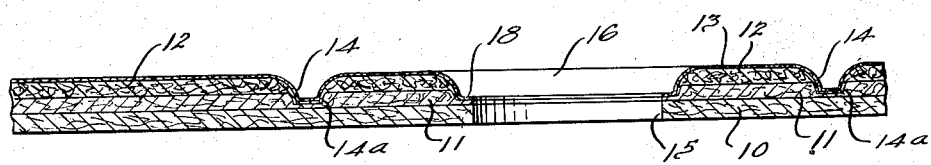
Fig. 2 is an enlarged section taken substantially through lines 2—2 of Fig. 1 looking in the direction of the arrows.

In the drawings there is illustrated, by way of example, one embodiment of the invention as applied to a decorative trim panel indicated at A, this panel being adapted to be mounted on the inside of an automobile door or other portion of the body so as to form a part of the interior trim thereof. In general the trim panel of the present embodiment comprises a stiff supporting foundation board 10, a relatively thick paper sheet 11 overlying the foundation board, a layer of padding or wadding 12 superimposed upon the sheet 11, and an outer facing sheet or covering layer 13 preferably formed of a fabric material. The foundation 10 and sheets 11, 12 and 13 are assembled in superimposed relation as shown in the drawings, and these laminations are subjected to a pressing operation during which they are subjected to heat and pressure and consolidated or unified to form the completed panel. The paper sheet 11 contains the bonding or adhesive material and during the pressing operation this material infuses into the cover material 13, the wadding 12 and the foundation 10 so that all of the laminations of the panel are firmly secured or bonded together at predetermined localities where pressure is applied. In the present instance the laminations are principally secured or bonded together along ornamental lines defined by relatively deep indentations or grooves 14. The arrangement of these grooves or indentations, shown in Fig. 1, is purely for illustrative purposes, as it will be apparent that the lines or localities at which the laminations are bonded together may be varied as to configuration in order to produce any desired pattern or design.

The foundation sheet or board 10 is preferably formed from a rigid and stiff board material providing the desired support for the remaining laminations of the panel. In some instances the material of the foundation board or sheet 10 may be made moisture resistant by impregnation with a resin or an asphalt material. However, in connection with a trim panel intended for use on the interior of an automobile body I prefer to utilize a heavy composition fibre board, such as Masonite board, which is not impregnated or treated for moisture resistant purposes.

The resinous or bonding material used for consolidating together the laminations of the trim panel is contained entirely in the sheet 11. This sheet preferably comprises a low density absorbent sheet of cellulosic material such as alpha cellulose or pulp paper which is not only highly absorbent but also compressible under the action of the dies during the hot pressing operation. The sheet 11 is treated or impregnated with a bonding substance preferably in the form of a thermo-setting resin, such as a phenol formaldehyde product. Where a resin of this character is used as the bonding agent, it is preferable to convert the resinous substance into a varnish by dissolving it in a suitable solvent. The sheet 11 may be impregnated by immersing it in the varnish so that the fibers of the sheet will become saturated. Accurate control of the amount of resin introduced into the sheet 11 may be obtained by controlling the percentage of resin contained in the varnish so that after the sheet 11 is dried it will contain substantially the exact amount of resin needed to produce the desired bonding action. In the drying operation the volatile solvent is expelled from the sheet 11 and the resinous material remaining in the sheet is partially reacted or polymerized so as to be capable of further reaction or polymerization when subjected to heat within the press.

The wadding or padding layer 12 comprises any suitable soft deformable material capable of being employed for cushioning the outer surface of the panel. For this purpose it is preferred to use material such as cotton batting although any other suitable kind of soft wadding material may be employed. The outer covering sheet 13 may be made of any suitable finishing material adapted to provide the panel with the desired ornamental or decorative appearance. Preferably the sheet 13 is in the form of a cloth material although it will be understood that other fabric material such as artificial leather may be used.

The various laminations comprising the foundation board 10, the resin impregnated sheet 11, the padding layer 12, and outside fabric covering sheet 13 are assembled as a unit and then introduced into a suitable press for the purpose of consolidating the laminations or layers together. The press is usually provided with heated upper and lower platens or dies formed so as to consolidate the layers together at the desired localities. During the pressing operation the temperature and pressure are so regulated that the resinous material contained in the sheet 11 is cured, but first such material contacts or infuses into the fabric outer covering 13, the padding layer 12 and foundation board 10 so that all of these layers or laminations will be firmly secured together at the localities where pressure is applied by the dies. In the present instance the dies are constructed so as to form relatively deep indentations or grooves 14, and since the resin impregnated sheet 11 is relatively thick and compressible the grooves or indentations 14 extend partially into this sheet as indicated at 14a. Along these lines of indentation 14 the resinous material in the sheet 11 will flow through the compressed wadding 12 and will penetrate the fabric 13 along the base of the indentations sufficiently so as to thoroughly consolidate these layers together at these localities. In addition, the resinous material will effect a permanent bond between the fabric and wadding layers and the foundation board in the locality of the grooves or indentations 14 where pressure is applied by the dies. As a consequence, the layers of the panel will be securely and permanently bonded together upon completion of the curing or reaction of the resin while substantial areas of the panel between the lines of indentation will remain uncompressed so as to give the panel as a whole a soft upholstered effect.

Figure 3:
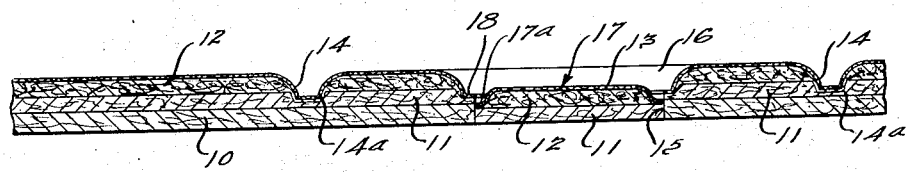
Fig. 3 is a section generally similar to Fig. 2 illustrating a step in the formation of an apertured countersunk depression or recess in the panel.
Figure 4:
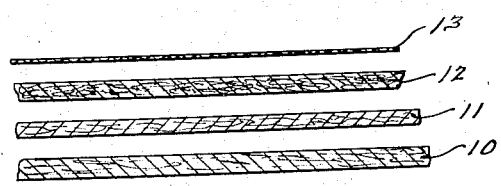
Fig. 4 is an exploded view illustrating the various laminations of the panel.

In some instances, particularly in connection with trim panels for the interior of automobile doors, it is necessary to form one or more apertures in the panel for the reception of the handle shaft or other actuating member or members commonly mounted upon the door for operating the door lock, window regulator or other device. Difficulties have heretofore been experienced in connection with the formation of such apertures in the panel on account of the fact that the edges of the fabric and wadding material around the edge of the aperture, after piercing the latter, remain ragged and unsealed with the edges of the material tending to fray especially during handling of the panels. In accordance with the present invention these diffculties are overcome by forming a countersunk depression or recess in the panel within which the aperture lies and in which the edge of the aperture is thoroughly sealed through the medium of the resinous material contained in the sheet 11 as a consequence of the action of the dies in the press. Before assembling the laminations 11, 12 and 13 with the foundation board 10 the latter is first pierced to provide any suitable number of apertures 15. When the panel laminations are inserted into the press an embossing portion on the upper platen registers with the aperture 15, and when the press is closed the layers 11, 12 and 13 are embossed or compressed at the locality of the aperture to provide a countersunk depression or recess 16 having a diameter at the bottom greater than the diameter of the aperture 15. While this embossing operation takes place a circular slug or knock-out piece 17 is separated from the panel layers and is forced downwardly into the aperture 15. This slug 17, as shown in Fig. 3, comprises superimposed sections of the paper sheet 11, the wadding 12 and the fabric 13. The die is formed so as to compress the marginal edge 17a of the slug 17 and to shear it from the adjoining layers within the depression or recess 16. Around the marginal edge of the slug 17 beyond the line of shearing the layers 11, 12 and 13 are compressed to form a narrow circular area 18 within which the layers are consolidated through the medium of the resinous material with the edges of the layers fully sealed. The circular slug or knock-out piece 17, after being forced into the aperture 15, will remain in the aperture during stacking and handling of the finished trim panel, and when the panel is ready to be mounted upon the inside of the door the piece 17 may be readily forced out of the aperture 15 by a blow or by the pressure of the thumb.

The use of the resin carrying sheet 11 achieves a number of important advantages in connection with the production of laminated articles, particularly trim panels of the kind embodying an intermediate padding layer and an outer fabric layer. By utilizing a low density relatively soft pulp sheet, having characteristics analogous to blotting paper, the desired amount of resin may be introduced into this sheet so as to ensure penetration of the padding and wetting of the fibers of the fabric 13 at the pressure localities without any excess of resin passing through the fabric during the hot pressing operation. Moreover, the relatively thick compressible sheet 11 will readily take the die impressions thereby deepening the ornamental indentations, thus desirably accentuating the same. Also the sheet 11 provides a pad-like element overlying the hard relatively incompressible foundation board 10 which will take up or compensate for die irregularities or variations. Furthermore, by localizing the resin or bonding substance entirely in the sheet 11 below the padding material 12 it is possible to eliminate any hard or stiff layer formation between the padding and fabric layers 12 and 13. Even a thin sheet of resin, or a sheet of material containing resin, interposed between the padding and fabric layers will harden or stiffen upon curing the resin and cause the fabric and padding layers to lose in part the soft "feel" that is highly desirable. Although the resin in the sheet 11 will cure during the hot pressing operation in the areas between the localities of pressure 14, this resin in these areas will not penetrate the padding 12 to the fabric 13 and hence the outer surface of the panel will remain soft and compressible.

I claim:

1. A panel-like article, comprising a relatively stiff foundation board, a top fabric layer, an intermediate layer of relatively soft compressible material interposed between said foundation and fabric layers, and means for bonding said foundation board, fabric and intermediate layers together comprising an absorbent resin impregnated paper sheet of materially greater thickness than said fabric layer interposed between said foundation board and said intermediate layer, said foundation board, layers and paper sheet being permanently held together at predetermined localities solely through the medium of said resin.

2. A panel-like article, comprising a relatively stiff foundation board, a top fabric layer, an intermediate layer of relatively soft compressible material underlying said fabric layer and in contact therewith, and a relatively thick absorbent paper sheet interposed between said foundation board and intermediate layer and in contact with each thereof, said paper sheet containing resinous material and said sheet, foundation board and layers being permanently held together in bonded relation solely through the medium of said resinous material.

3. A panel-like article, comprising a plurality of laminated sheets including a foundation sheet, a top fabric sheet, a padding sheet underlying the fabric sheet, and an absorbent paper sheet of greater thickness than the fabric sheet interposed between the foundation and padding sheets and containing a resinous material, said sheets having an aperture therethrough with the marginal area bounding the aperture permanently depressed below the adjoining top surface of the panel, said paper sheet being compacted and reduced in thickness and permanently held in bonded relation to said remaining sheets in said marginal area.

4. A panel-like article, comprising a plurality of laminated sheets including a foundation sheet, a top fabric sheet, a padding sheet underlying the fabric sheet, and an absorbent paper sheet of greater thickness than the fabric sheet interposed between the foundation and padding sheets and containing a resinous material, said sheets having an aperture therethrough with the marginal area bounding the aperture permanently depressed below the adjoining top surface of the panel, the padding and paper sheets in said area being reduced in thickness and bonded together.

5. A panel-like article, comprising a plurality of laminated sheets including a foundation sheet, a top fabric sheet, a padding sheet underlying the fabric sheet, and an absorbent paper sheet of greater thickness than the fabric sheet interposed between the foundation and padding sheets and containing a resinous material, said sheets having an aperture therethrough with the marginal area bounding the aperture permanently depressed below the adjoining top surface of the panel and with the sheets consolidated together in said area through the medium solely of the resinous material contained in said paper sheet.

6. The method of making a panel-like article, including the steps of laminating together a stiff foundation sheet having an aperture pierced therein, a top fabric sheet, an intermediate padding sheet and a relatively thick resin impregnated sheet of low density interposed between the foundation and padding sheets; separating a portion of the fabric, padding and resin impregnated sheets from the remainder thereof while forcing such portion into said aperture, and consolidating said sheets together along the margin of said aperture.

7. The method of making a panel-like article, including the steps of laminating together a stiff foundation sheet having an aperture pierced therein, a top fabric sheet, an intermediate padding sheet and a resin impregnated paper sheet interposed between the foundation and fabric sheets; separating from said fabric, padding and paper sheets a portion corresponding substantially to the area of said aperture and forcing said portion into said aperture, and compressing said sheets together around the margin of said aperture to provide a depressed area in which the sheets are bonded together.

8. The method of making a panel-like article, including the steps of laminating a foundation sheet having an aperture therein and a plurality of cover sheets, separating from said cover sheets a portion corresponding substantially to the area of said aperture and forcing said portion into said aperture while consolidating said sheets together through the medium of a bonding material.

9. The method of making a panel-like article, including the steps of laminating together a stiff foundation sheet, a top fabric sheet, an intermediate padding sheet and a resinous layer interposed between the foundation and padding sheets; separating a portion of the fabric and padding sheets from the remainder thereof while forcing said portion into an aperture in said foundation sheet, and consolidating said sheets together along the margin of said aperture through the medium of said resinous layer.

10. The method of making a panel-like article, including the steps of laminating together a stiff foundation sheet, a top fabric sheet, an intermediate padding sheet and a resinous layer interposed between the foundation and padding sheets; separating a portion of the fabric and padding sheets from the remainder thereof while forcing said portion into an aperture in said foundation sheet, and compressing said sheets together around the margin of said aperture to provide a depressed area in which the sheets are bonded together through the medium of said resinous layer.

11. A panel-like article, comprising a plurality of laminated sheets including a foundation sheet, a top fabric sheet, a padding sheet underlying the fabric sheet, and a paper sheet interposed between the foundation and padding sheets and containing a resinous material, said sheets having an aperture therethrough with the marginal area bounding the aperture permanently depressed below the adjoining top surface of the panel, the padding sheet in said area being reduced in thickness and said sheets being consolidated together in said area through the medium of the resinous material contained in said paper sheet.

12. The method of making a panel-like article including the steps of laminating a foundation sheet having an aperture therein and a plurality of cover sheets with a layer of bonding material interposed between certain sheets, consolidating said sheets together around the margin of said aperture through the medium of said bonding material and at the same time separating from said cover sheets a portion thereof and forcing the same into said aperture.

13. The method of making a panel-like article including the steps of laminating together a foundation sheet having an aperture therein, a top cover sheet and an intermediate padding sheet with a layer of bonding material interposed between certain of said sheets; compressing said sheets together around the margin of said aperture to provide a depressed area in which the sheets are bonded together through the medium of said bonding material and at the same time separating a portion of the fabric and padding sheets from the remainder thereof and forcing said portion into said aperture.

14. A panel-like article comprising a plurality of laminated sheets including a foundation sheet, a top cover sheet, a padding sheet underlying said cover sheet, and a layer of bonding material interposed between certain of said sheets, said sheets having an aperture therethrough with the marginal area bounding the aperture permanently depressed below the adjoining top surface of the panel, the padding sheet in said marginal area being reduced in thickness and said sheets being consolidated together in said area through the medium of said bonding material.

LAWRENCE B. WEYMOUTH.

REFERENCES CITED

The following references are of record in the file of this patent:

UNITED STATES PATENTS

| Number | Name | Date |
| --- | --- | --- |
| 1,414,420 | Kempton | May 2, 1922 |
| 1,820,259 | Wandel | Aug. 25, 1931 |
| 1,995,734 | Callahan | Mar. 26, 1935 |
| 1,999,385 | Woodall | Apr. 30, 1935 |
| 2,099,989 | Osborn | Nov. 23, 1937 |
| 2,134,496 | Zinser | Oct. 25, 1938 |
| 2,202,963 | Randall | June 4, 1940 |
| 2,287,159 | Zinser | June 23, 1942 |
| 2,369,658 | Burns | Feb. 20, 1945 |